United States Patent [19]
Mullins et al.

[11] Patent Number: 5,677,945
[45] Date of Patent: Oct. 14, 1997

[54] ACCOUNT BALANCING AND MONITORING SYSTEM FOR A TELECOMMUNICATIONS NETWORK

[75] Inventors: Samuel Mullins; Norman Reed, both of Cedar Rapids, Iowa

[73] Assignee: MCI Corporation, Washington, D.C.

[21] Appl. No.: 468,321

[22] Filed: Jun. 6, 1995

[51] Int. Cl.[6] .................................................. H04M 11/00
[52] U.S. Cl. ............................ 379/91; 379/114; 379/144
[58] Field of Search ............................. 379/91, 112, 111, 379/114, 121–123, 131, 132, 144, 154, 155, 93

[56] References Cited

U.S. PATENT DOCUMENTS

| | | | |
|---|---|---|---|
| 5,265,155 | 11/1993 | Castro | 379/112 |
| 5,353,335 | 10/1994 | D'Urso et al. | 379/144 |
| 5,450,477 | 9/1995 | Amarant et al. | 379/91 |
| 5,469,497 | 11/1995 | Pierce et al. | 379/91 |

Primary Examiner—Wing F. Chan

[57] ABSTRACT

A system and method provide prepaid telecommunication services using credit or debit cards in a telecommunication network including a central data base. The system monitors card balances while blocking multiple use of card balances and sends warning messages to subscribers on card balances which approach a threshold amount. Upon initiation of a telephone call, a subscriber card balance corresponding to the subscriber's credit or debit account is retrieved from the central data base. Status flags are set in the central database indicating that a telephone call is in progress for that account. A switching station monitors the telephone call and initiates an alarm when the call time approaches a threshold amount specified for the card balance. The system announce to the subscriber and/or blocks the termination of the call when the threshold amount has been exceeded and a further limit specified for the card balance has been reached. The card balance in the central data base and the status flags are changed upon completion or termination of the call.

9 Claims, 4 Drawing Sheets

ACCOUNT BALANCING AND MONITORING SYSTEM FOR A TELECOMMUNICATIONS NETWORK

BACKGROUND OF THE INVENTION

1. Field of the Invention

The present invention relates to the field of telecommunications billing, and in particular, to a system and method for validating and processing credit or debit accounts in a telecommunications network.

2. Description of the Prior Art

For telecommunications calls that are carried out from pay telephones and other locations not directly connected to the subscriber's telephone line, it is customary to charge the calls to a credit or debit account. To use such a credit or debit account, the subscriber will typically call a telephone operator (or automatic computer program) and provide an account number printed on a credit or debit card. The operator (or automatic process) will then check a database to determine the validity of and balance in the credit or debit account. As long as the subscriber's credit balance is below the allowable credit limit or the debit balance is above zero, the operator (or automatic program) will initiate the telephone call.

An example of such a system may be found in U.S. Pat. No. 5,265,155 to Castro, the specification of which is incorporated herein by reference. This patent discloses in FIGS. 10 and 11, a system for prepayment of telecommunication calls including means for checking the existing balance of a prepayment account at a central database and for transmitting a message to the subscriber indicating the amount of the current balance at the moment the subscriber initiates a telephone call. While the call progresses, the balance is periodically diminished at the central database in accordance with the usage costs of the call. When the balance approaches zero, the system further includes means to inform the subscriber and/or initiate a termination request for the call, and includes additional options such as allowing the caller an additional credit beyond the prepaid usage of the debit card.

While the system described in U.S. Pat. No. 5,265,155 provides a useful way to handle credit and debit calls, it suffers from the inconvenience that the subscriber's balance must be continually updated at the central database as the call proceeds. When many such calls are in progress, the necessity to continually update the balance increases the processor loading at the central database. Thus, it would be more efficient of network resources to access the central database only twice—once to read the balance at the initiation of the telephone call and a second time to update the balance at the termination of the call while monitoring the balance locally in order to terminate a call when the credit limit is reached or the debit amount approaches zero.

However, simply establishing a local process to monitor the balance during a telephone call does not solve all of the potential problems, because the possibility exists that the account may become corrupted due to attempts by multiple users to use the same credit or debit account at approximately the same time. In such cases, two callers competing for the same credit or debit balance at the same time complicates monitoring of balances. Further, notifying or interrupting the caller when the balance is nearly used up would involve an extensive logical process, such that the balance could be used up before the process was completed. Accordingly, a prepaid telecommunications system which limits use of system resources in monitoring credit or debit balances of prepaid services, locks out multiple use of a balance and provides a warning announcement when the balance on a card is approaching zero would enhance the utility of such services and improve the performance of telecommunications systems.

SUMMARY OF THE INVENTION

An object of the invention is an improved system and method for providing prepaid services on a telecommunications network.

Another object is a system and method for handling credit and debit transactions on a telecommunications network in a way which reduces billing communications, yet which enables accurate monitoring of call balance.

Another object is a system and method for blocking multiple requests for service on the same account number while the call is proceeding.

Another object is a system and method for providing a warning announcement to a caller when a credit or debit card balance approaches a threshold amount.

Still another object is a method and system for handling credit and debit transactions on a telecommunications network which is simple to carry out, and does not require large processor loading at a central subscriber database.

These and other objects are met in the present invention which comprises means to retrieve a subscriber's balance data from a central database corresponding to the subscriber's credit or debit account at the initiation of a call; means to set a status flag at the central database indicating that a call is in progress for that account; means to locally monitor the telephone call and to present an alarm when the call has approached a limit; means to announce the termination of the call and/or block the call when the call has reached a further limit; and means to update the balance in the central database and to change the status flag upon completion (or termination) of the call.

DESCRIPTION OF THE PREFERRED EMBODIMENT

Figure 1:
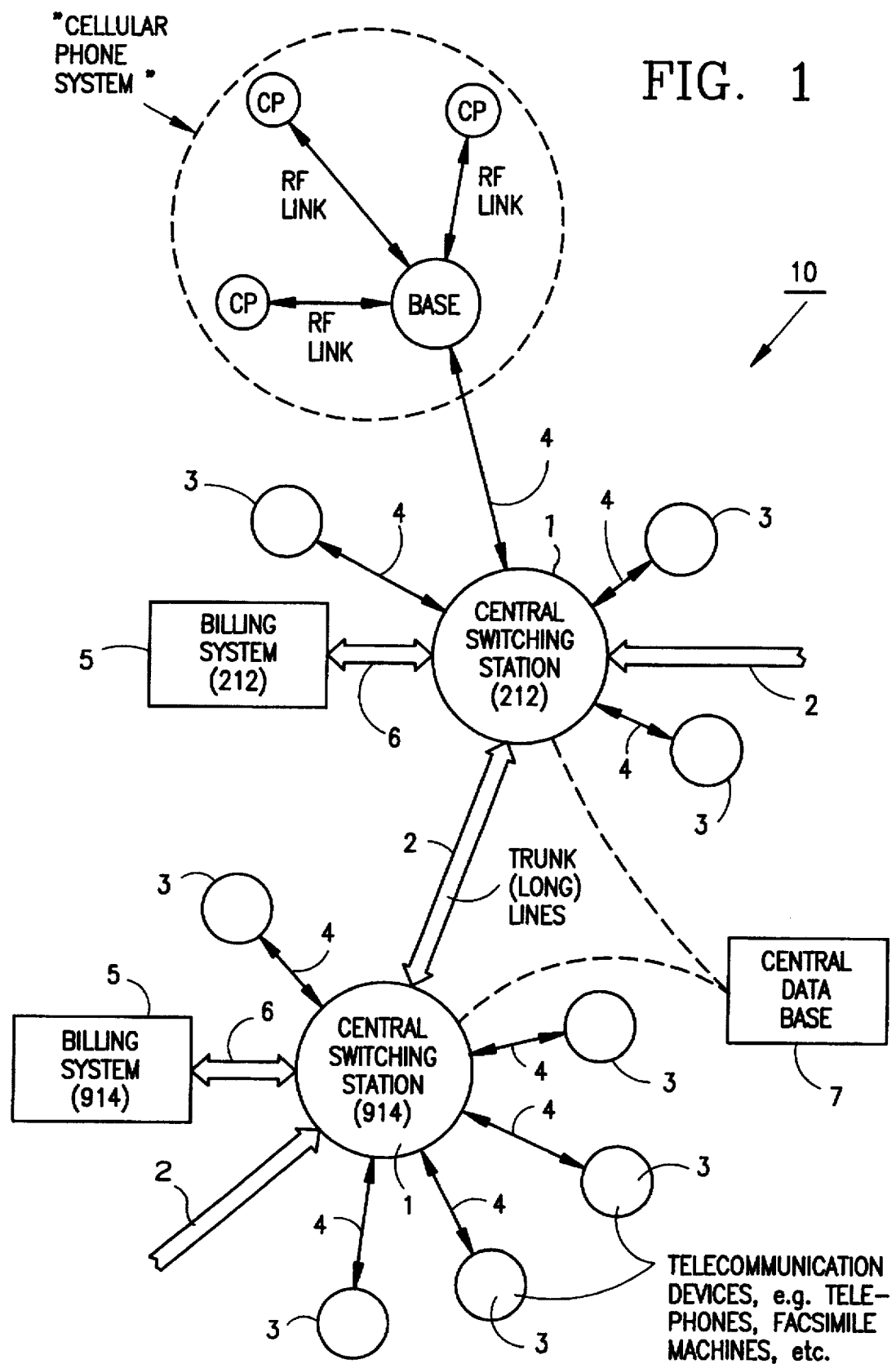
FIG. 1 is a block diagram of a prior art telecommunication network, suitable for use with the present invention.

In FIG. 1 a telecommunications network 10 comprises a plurality of central switching stations (CSS) 1, a plurality of trunks 2 interlinking the CSSs, and a plurality of telecommunication devices (TD) 3, such as telephones, pay telephones, facsimile machines, etc. connected to the CSSs. Also shown is a cellular phone system linked to one of the CSSs.

In the present invention, which will be described for the case of a debit card, the telecommunications system 10 of FIG. 1 is augmented to include at least one central database (CD) 7 linked to at least one of the CSSs. The CD 7 contains records corresponding to each authorized subscriber and stores or holds pertinent account information such as the following:

| | | |
|---|---|---|
| AN | AccountNumber | Number on Debit Card |
| RB | RemainingBalance | Remaining balance (in money units) |
| LS | LockStatus: | IDLE, READ, or CIP (CALL_IN_PROGRESS) |
| LTS | LockTimestamp: | the last time the lock status changed |
| RT | RemainingTime: | Remaining time available, based on RemainingBalance |
| CR | CurrentRate: | price rate used in computing remaining time |
| WT | WarningTime: | seconds left when warning customer of near consumption of balance |
| WS | WarningScript: | message to be sent at Warning Time |
| ES | EndScript: | message to be sent at the end of the call |
| CN | CalledNumber: | telephone number to be called |
| RE | Renew/Extend: | whether subscriber has authority to renew and/or extend the debit balance |

Each CSS further includes means for downloading the subscriber information from the CD and locally monitoring the Remaining Balance RB (or similarly the RemainingTime RT) for the call and issuing an alarm or terminating the call when the balance reaches an appropriate threshold.

In the preferred embodiment of the present invention, a single, authoritative copy of the subscriber's record is maintained at the CD and other copies are downloaded to the CSS using a locking protocol to ensure that plural subscribers are incapable of tapping the same account balance at the same time. The locking protocol also includes the capability to prevent an accidental permanent locking by aging the lock status, as will be described below.

Figure 2A:
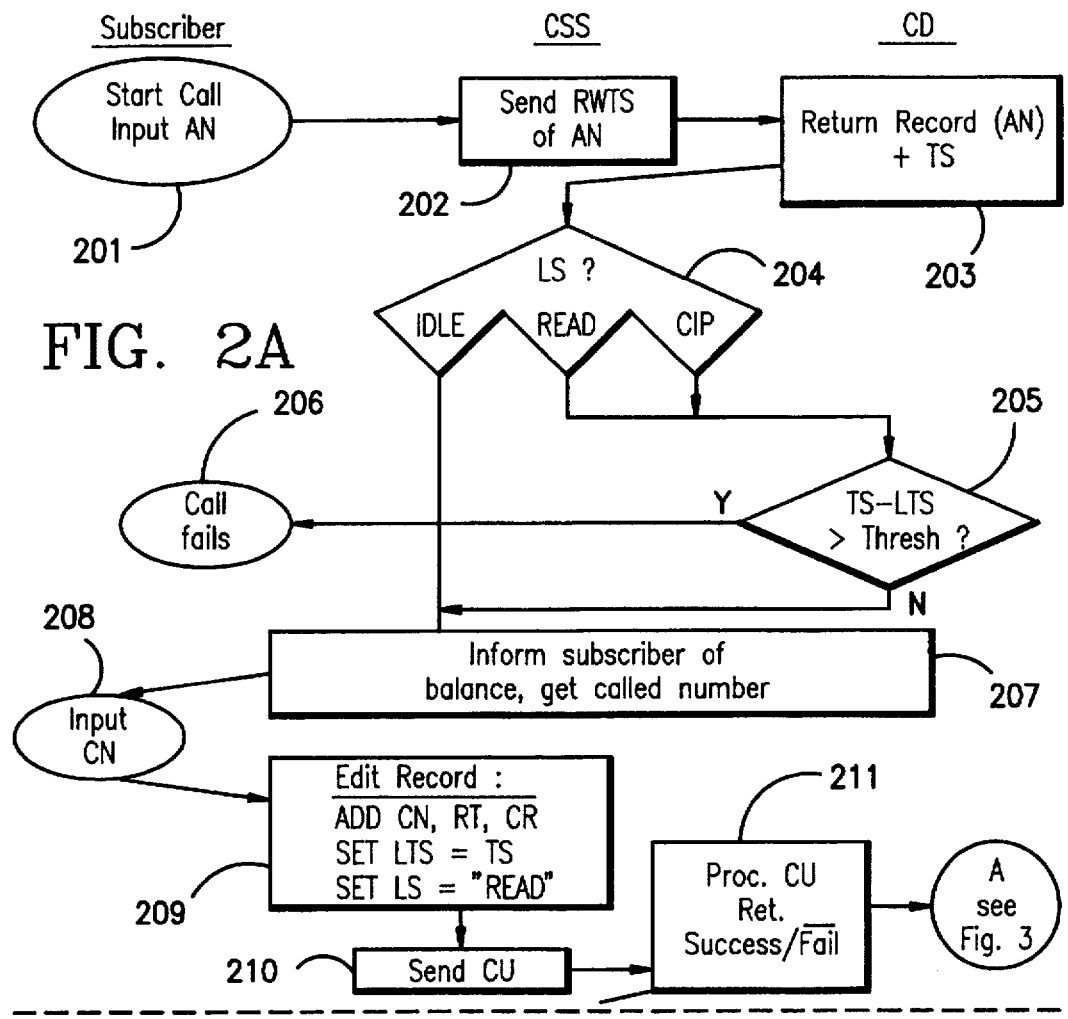
FIGS. 2A–2C are flow diagrams carried out among a subscriber, a central switch, and a central database in a system of FIG. 1 in accordance with the invention.
Figure 2B:
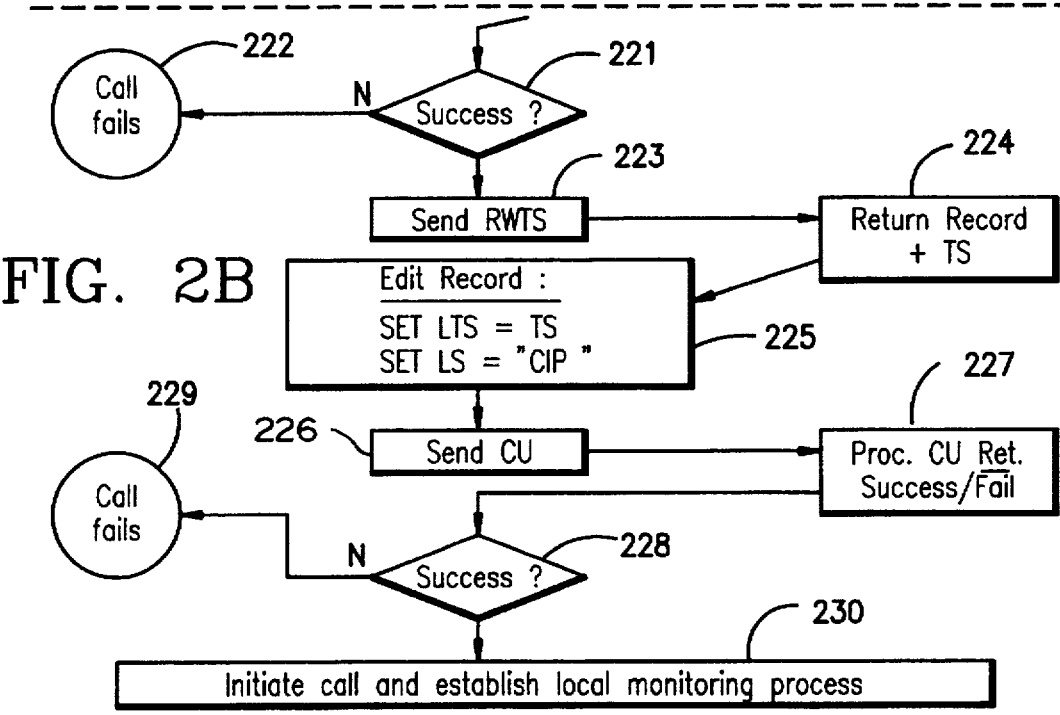
Figure 2C:
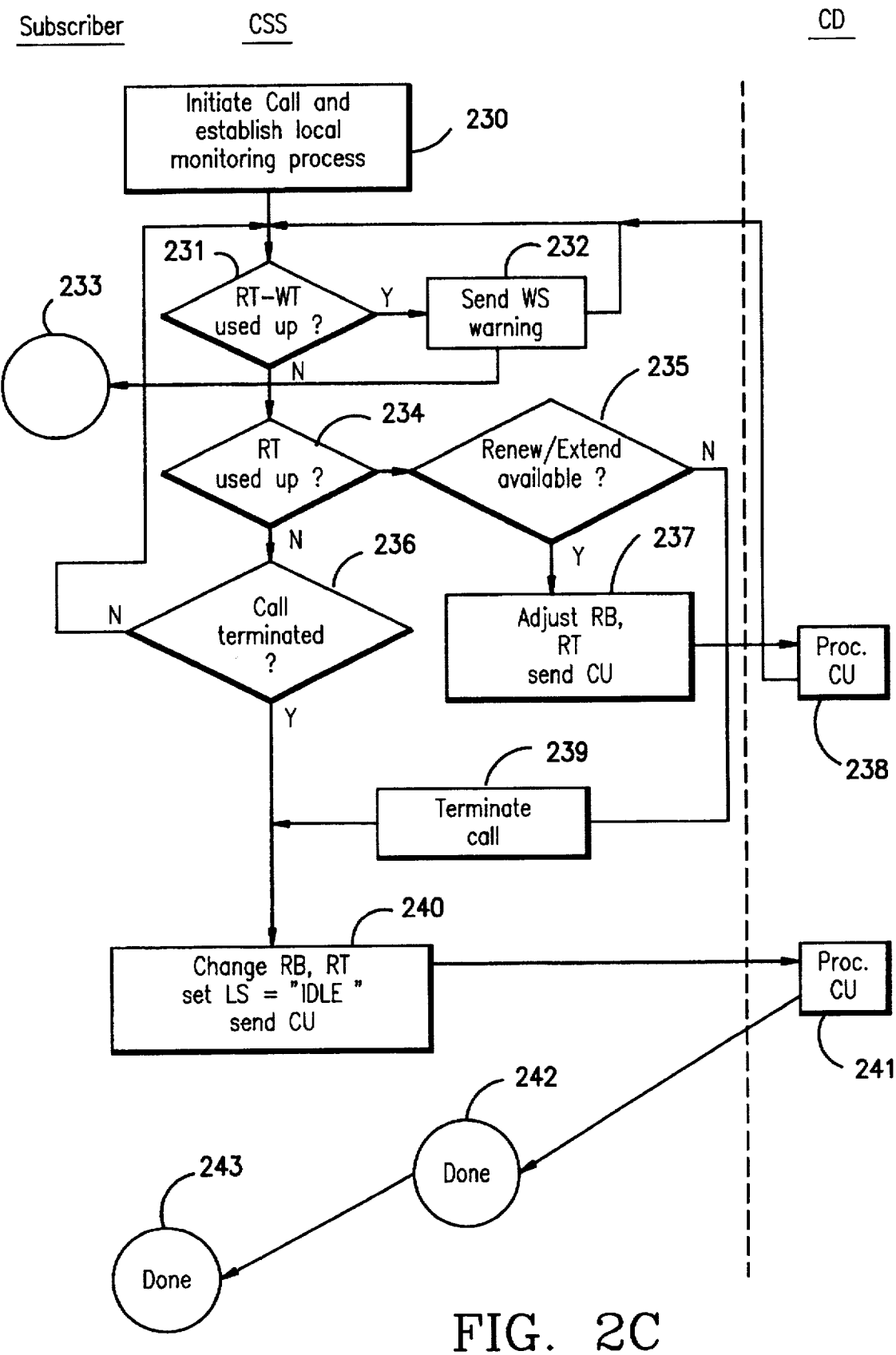

The operation of the telecommunications system with the locking protocol and warning announcement to the caller is shown in detail in FIGS. 2A–2C. Each flow chart indicates in multiple columns the operation or step performed by the subscriber devices 3, the central station switch 1 and the central database 7 (see FIG. 1). In FIG. 2A, a subscriber initiates a telephone call (step 201) using one of the devices 3 to connect to a CSS. In initiating the call, a subscriber is prompted by either an automatic message generated at the CSS or by a human operator, to provide the account number AN for the debit card. The subscriber may enter the AN by voicing the digits, or by using a DTMF keypad, a magnetic stripe reader, a SMART CARD reader, a modem, or other suitable means as is well known in the art. In a step 202, the CSS contacts the CD either through the telecommunication network, or through an auxiliary communication network (not shown). In an operation 203, the CD provides the subscriber's account information to the CSS in order to validate the call and establish the local monitoring process.

In more detail, the CSS in step 202, upon receiving a valid AN from the subscriber, sends a ReadWithTimeStamp (RWTS) to the CD to obtain a copy of the current record for that account number and the current time at the CD. The CD returns the current record with the current timestamp (TS) in the operation 203, and in an operation 204, the CSS examines the lockstatus field (LS) of the record to determine if the record is already locked. If the record is not locked (LS="IDLE"), the CSS is free to send a command to the CD to update the record with new information. However, if the record is already locked (LS="READ" or call in progress LS="CIP"), then in an operation 205 the call fails and the subscriber is notified in an operation 206 unless the difference between the current TS and the previously locked time stamp (LTS) is greater than a threshold, indicating a permanently locked condition.

Figure 3:
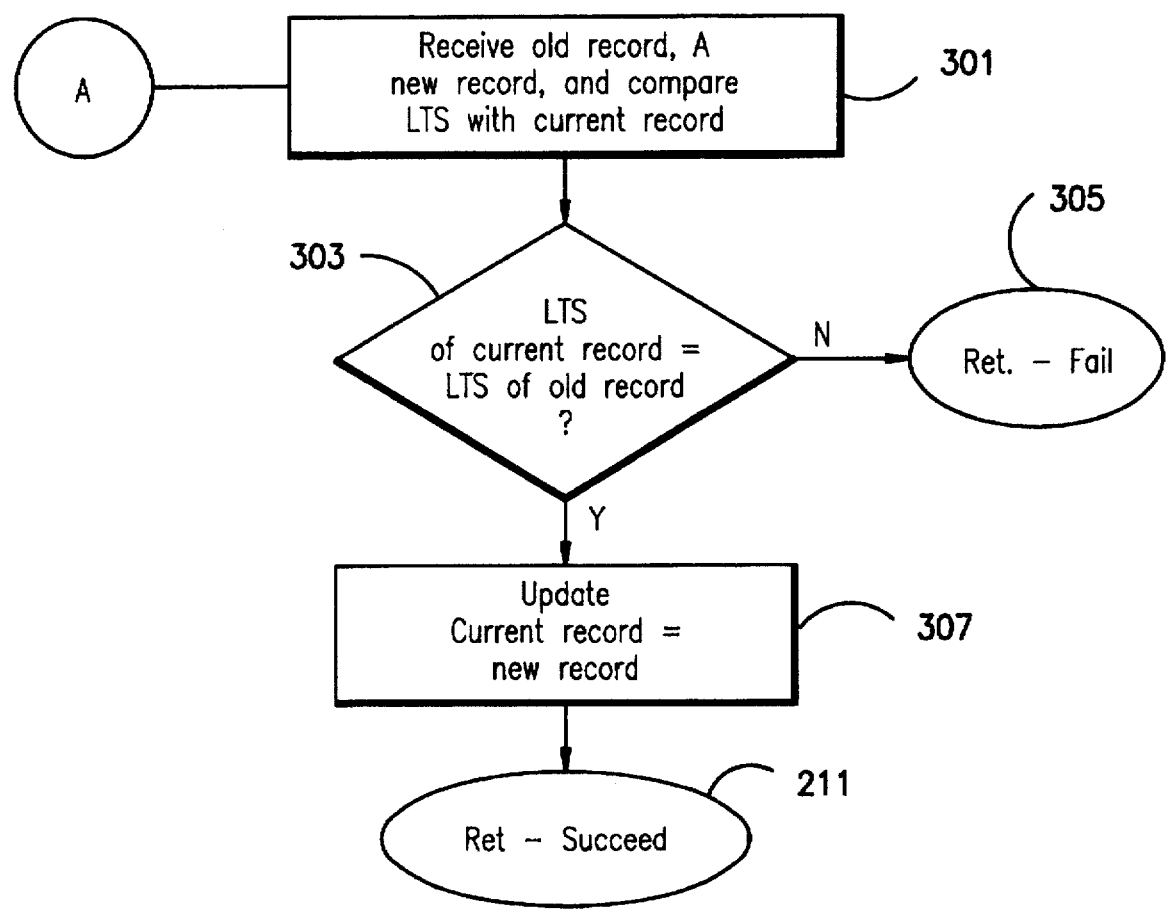
FIG. 3 is a flow diagram of processing steps in a central database performed as a part of the processes of FIGS. 2A–2C.

Thus, if the current record indicates an idle condition, or if the lock status is overridden due to detection of a permanent lock condition, the CSS informs the subscriber of the current RB (either by displaying the information at the subscriber's telephone device (TD), or by sending a voice message from either a human operator or a voice synthesizer) and requests the called number (CN) in an operation 207. After the subscriber provides the called number in an operation 208, the CSS uses the CN to compute the current rate (CR) (which may be a function of the distance from the subscriber to the called number), and to compute the remaining time (RT) based upon the remaining balance (RB) and credit balance (CR) in an operation 209. The CSS then changes the local record to LS="READ", inserts TS obtained in the operation 203, and issues a conditional update (CU) to the CD in an operation 210. The CD commences to process the conditional update in an operation 211, which will be more fully described in connection with FIG. 3.

In an operation 301, the CD receives both the old record and the new record from the CSS, thereby allowing the CD to compare the old record with the record it currently holds to determine if the current CSS request for update is based upon the most recent RWTS request. In particular, in an operation 303, the CD compares the LTS fields containing the most recently recorded timestamps of the old record and the current record. If the LTS fields do not match, then some other CSS has updated the record in the intermediate time. In that case, the CD returns the code "FAIL" in an operation 305. If the LTS fields do match, then the CD updates the current record with the new record passed from the CSS and sends a "SUCCESS" message to the CSS as a part of the operation 211.

Turning now to the operation of the locking protocol shown in FIG. 2B, in an operation 221 the CSS, upon receipt of a code "SUCCESS", issues another RWTS to the CD in an operation 223 or sends a call fail announcement to the subscriber in an operation 222. The CD in an operation 224 returns the subscriber record with the current time stamp. In an operation 225, the CSS edits the returned record by changing the LS to "CIP" and the LTS to TS. The CSS then sends a conditional update CU to the CD in an operation 226. The CD processes the conditional update (CU) and returns a "SUCCESS" or "FAIL" message in an operation 227. At this point, there should be no contention conflicts from other CSSs because they were screened out by the earlier conditional update (CU) conducted in the operation 210 and the LS check in the operation 204. However, the issuing of a CU in the preferred embodiment is viewed as a precautionary measure to ensure against a possible unforeseen degenerate condition. When the CD indicates a successful update of the record to LS="CIP", the CSS in an operation 228 proceeds to terminate the call in an operation 229 or establish the telephone call and local monitoring process in an operation 230.

Turning to FIG. 2C, in an operation 230, the CSS establishes the call and initiates the local monitoring process. In an operation 231, the CSS obtains the remaining time (RT) and the warning time (WT) from the record, computes a time period RT-WT and sets a timer for the period. When the time period is reached or expires an operation 232 is initiated by the CSS to send a warning message to the subscriber. The warning message (WS) is sent to the subscriber (either by modem, voice generation, human voice, or similar method). When RT itself is used up, the CSS in an operation 234 checks to see if it is possible to extend and/or renew the balance in an operation 235. If a "yes" condition exists for the operation 235, the CSS proceeds to adjust the RB and RT fields in an operation 237 and to update the CD using a conditional update in an operation 238. Prior to adjusting RB and RT, and if a "no" condition exists, the CSS may also prompt the subscriber to determine whether the subscriber desires to extend and/or renew the remaining balance (RB), and if so, by how much. In the event it is not possible to extend and/or renew the balance, the CSS terminates the telephone call in an operation 239. When the call is terminated, the remaining balance (RB), the remaining time (RT), the lock status (LS) which is "idle" is sent to the CD as a conditional update in an operation 240.

Alternatively, it may also happen that the subscriber terminates the call before the balance is completely used up. Whether the call is terminated by the subscriber, or the call is terminated by the CSS, as in the above, because the remaining balance (RB) became zero, the CD must still be updated with the new remaining balance (which may be zero). Thus, the CSS issues a final CU to the CD which is processed in an operation 241.

By using the above locking protocol, it is possible for a local monitoring process to monitor the call in progress, and to break into the call and/or terminate the call when the available balance is used up without requiring intermediate action by a central database. In addition, because of the locking protocol, all other subscribers are effectively blocked from using the same available balance while a previous call is in progress.

While the foregoing description is based on an example of a debit account, it should be clear to those skilled in the art that a similar discussion may equally be made for a credit card—so long as appropriate changes are made for the balance increasing until reaching a credit limit instead of decreasing until zero. Other modifications of the preferred embodiment will also be clear to those skilled in the art, which, however should rightly be included in the scope of the invention.

While a specific embodiment of the invention has been disclosed, it will be understood by those having skill in the art that changes can be made to the specific embodiment without departing from the spirit and scope of the invention.

What is claimed is:

1. In a telecommunications network, a plurality of switching stations each connected to a central database, said each switching station providing prepaid telecommunication services using credit or debit cards comprising:

a) means for downloading from said central database to said each switching station a subscriber card balance from said central data base corresponding to the credit or debit account of a subscriber upon initiation of a call by said subscriber;

b) means for setting at least one status flag at said central database to indicate that a call is in progress for said account and to prevent others of said switching stations from downloading and using said subscriber card balance;

c) means for monitoring said call and for issuing an alarm to said subscriber when the duration of said call causes the amount of said subscriber card balance to approach a threshold amount specified for said subscriber card balance;

d) means for terminating said call and/or blocking said call when said threshold amount has been exceeded and a further limit specified for said subscriber card balance is reached; and e) means for uploading the amount of said subscriber card balance in said each switching station to said central database to update said subscriber card balance in said central database and for changing said one status flag upon completion or termination of said call.

2. The switching station of claim 1, wherein said central database further comprises other stored records for each subscriber account including lock time status, lock time stamp, remaining time, warning time, and remaining card balance.

3. The switching station of claim 2, further comprising:
    means for generating a subscriber record and a read with time stamp upon initiation of said telephone call by said subscriber;
    means for determining if said record is in an "idle", "read" or "call in progress" status.

4. The switch system of claim 3, further comprising:
    means for informing said subscriber of the card balance when said threshold amount has not been exceeded;
    means for editing said subscriber record when said subscriber initiates another telephone call;
    wherein said central database is updated with the edited subscriber record upon completion or termination of said another call.

5. The switching system of claim 4, further comprising:
    means for receiving a "success" signal from said central database when the lock time status of said subscriber record equals the lock time status of the updated subscriber record;
    means for sending a read with time stamp message to said central data base;
    means for receiving a subscriber record with a time stamp from said central data base and editing the record to indicate the lock time stamp equals the time stamp and the lock status equals call in progress.

6. The switching system of claim 5, further comprising:
    means for updating said central database with an update of said subscriber record and initiating the subscriber call if the "success" signal is returned by the central database.

7. The switching system of claim 6, further comprising:
    means for determining if remaining call time is more than a warning time;
    means for setting a timer to indicate the remaining time available to said account; and
    means for sending a warning message to said subscriber upon expiration of the warning time.

8. The switching system of claim 7, further comprising:
    means for renewing or extending the remaining time on said subscriber record; and
    means for adjusting the balance and time remaining on said subscriber record.

9. In a telecommunications network including at least one switching station and at least one database in communication with said switching station, said database having stored therein data including account numbers and account balances of funds related to said account numbers, a method of monitoring and interrupting a call placed from said switching station to said telecommunications network when the available fund associated with the account number of said call is exhausted, comprising the steps of:

a) inputting an account number of a subscriber who wishes to place a call to said telecommunications network;

b) downloading from said database the available fund balance and locking data for said account number;

c) analyzing said locking data to determine if said account number is being used;

d) conditionally updating said database with new locking data if said account number is determined not being used;

e) initiating said call placed by said subscriber if said conditionally updating of said database succeeds;

f) monitoring the call duration of said call;

g) issuing a warning to said subscriber if said call duration approaches a predetermined threshold;

h) terminating said call if said call duration reaches a second predetermined threshold; and i) updating said database with a final account balance after said call is either completed or terminated.

* * * * *